United States Patent
Allochis

(10) Patent No.: US 10,257,981 B2
(45) Date of Patent: Apr. 16, 2019

(54) CONVEYOR BELT TENSING APPARATUS FOR A HARVESTING HEADER

(71) Applicant: Jose Luis Allochis, Buenos Aires (AR)

(72) Inventor: Jose Luis Allochis, Buenos Aires (AR)

(*) Notice: Subject to any disclaimer, the term of this patent is extended or adjusted under 35 U.S.C. 154(b) by 81 days.

(21) Appl. No.: 15/488,756

(22) Filed: Apr. 17, 2017

(65) Prior Publication Data
US 2017/0215342 A1 Aug. 3, 2017

Related U.S. Application Data

(63) Continuation-in-part of application No. 14/735,196, filed on Jun. 10, 2015, now abandoned.

(51) Int. Cl.
| | | |
|---|---|---|
| A01D 57/20 | (2006.01) | |
| B65G 23/44 | (2006.01) | |
| A01D 43/06 | (2006.01) | |
| A01D 41/14 | (2006.01) | |

(52) U.S. Cl.
CPC ............ A01D 57/20 (2013.01); B65G 23/44 (2013.01); *A01D 41/14* (2013.01); *A01D 43/06* (2013.01)

(58) Field of Classification Search
CPC ........ A01D 57/20; A01D 41/14; A01D 43/06; A01D 61/002; B25G 23/44
See application file for complete search history.

(56) References Cited

U.S. PATENT DOCUMENTS

| | | | | |
|---|---|---|---|---|
| 2,762,183 | A * | 9/1956 | Linscheid | A01D 57/20 56/14.4 |
| 4,421,228 | A * | 12/1983 | Marsiglio | B65G 23/44 198/814 |
| 5,609,238 | A * | 3/1997 | Christensen | B65G 15/24 198/583 |
| 5,806,632 | A * | 9/1998 | Budd | B66B 9/0853 187/200 |
| 5,896,979 | A * | 4/1999 | Hokari | G03G 15/755 198/806 |
| 5,899,321 | A * | 5/1999 | El-Ibiary | B65G 39/16 198/807 |
| 5,984,083 | A * | 11/1999 | Hosch | B65G 23/44 198/810.04 |
| 6,202,397 | B1 * | 3/2001 | Watts | A01D 61/002 56/14.5 |
| 6,695,130 | B1 * | 2/2004 | Blaylock | B65G 23/44 198/813 |
| 6,802,414 | B2 * | 10/2004 | Buhne | B65G 23/44 198/813 |
| 7,448,491 | B1 * | 11/2008 | Tippery | A01D 57/20 198/813 |
| 8,272,198 | B1 * | 9/2012 | Allochis | A01D 41/14 56/153 |
| 8,495,855 | B1 * | 7/2013 | Conrad | A01D 61/002 56/16.4 R |
| 8,573,388 | B2 * | 11/2013 | Hoffman | A01D 41/14 198/814 |

(Continued)

*Primary Examiner* — Robert E Pezzuto
*Assistant Examiner* — Adam J Behrens
(74) *Attorney, Agent, or Firm* — Defilio & Associates, Inc.; Evelyn A. Defilio

(57) ABSTRACT

A compact belt tensioner to be installed in draper harvesting headers that accommodates the flexing and twisting of the conveyor belts and generates a constant tension evenly distributed across the width of the conveyor belts. The tensioner performs an automatic belt tension without the operators intervention.

17 Claims, 6 Drawing Sheets

(56) References Cited

U.S. PATENT DOCUMENTS

| | | | |
|---|---|---|---|
| 2003/0015405 A1* | 1/2003 | Buhne | B65G 23/44 198/813 |
| 2005/0045452 A1* | 3/2005 | Iseli | B65G 23/44 198/813 |
| 2007/0193243 A1* | 8/2007 | Schmidt | A01D 41/14 56/181 |
| 2007/0251203 A1* | 11/2007 | Coers | A01D 61/02 56/181 |
| 2008/0276590 A1* | 11/2008 | Sauerwein | A01D 41/14 56/153 |
| 2009/0007534 A1* | 1/2009 | Sauerwein | A01D 41/14 56/14.5 |
| 2009/0236823 A1* | 9/2009 | Prem | B62D 13/005 280/426 |
| 2009/0249760 A1* | 10/2009 | Sauerwein | A01D 41/14 56/181 |
| 2009/0288383 A1* | 11/2009 | Sauerwein | A01D 41/14 56/181 |
| 2009/0320431 A1* | 12/2009 | Puryk | A01D 41/14 56/181 |
| 2012/0317953 A1* | 12/2012 | Allochis | A01D 57/20 56/153 |
| 2013/0092512 A1* | 4/2013 | Buschmann | B65G 23/44 198/839 |
| 2013/0097986 A1* | 4/2013 | Lovett | A01D 41/14 56/153 |
| 2013/0105282 A1* | 5/2013 | Hoffman | A01D 41/14 198/814 |
| 2013/0284567 A1* | 10/2013 | Beltman | B65G 23/44 198/807 |
| 2014/0059995 A1* | 3/2014 | Cormier | A01D 43/06 56/181 |
| 2014/0075912 A1* | 3/2014 | Fuechtling | A01D 43/06 56/181 |

* cited by examiner

FIG. 5
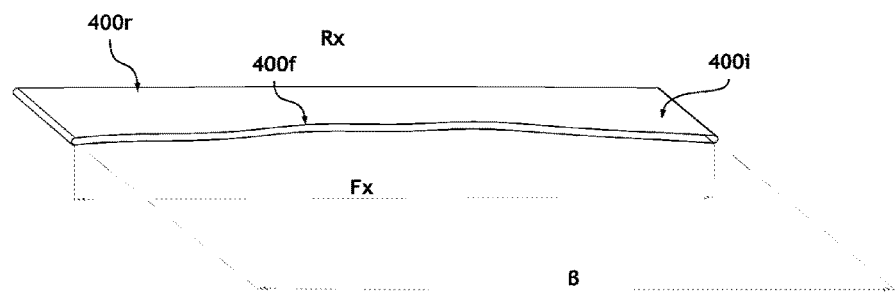
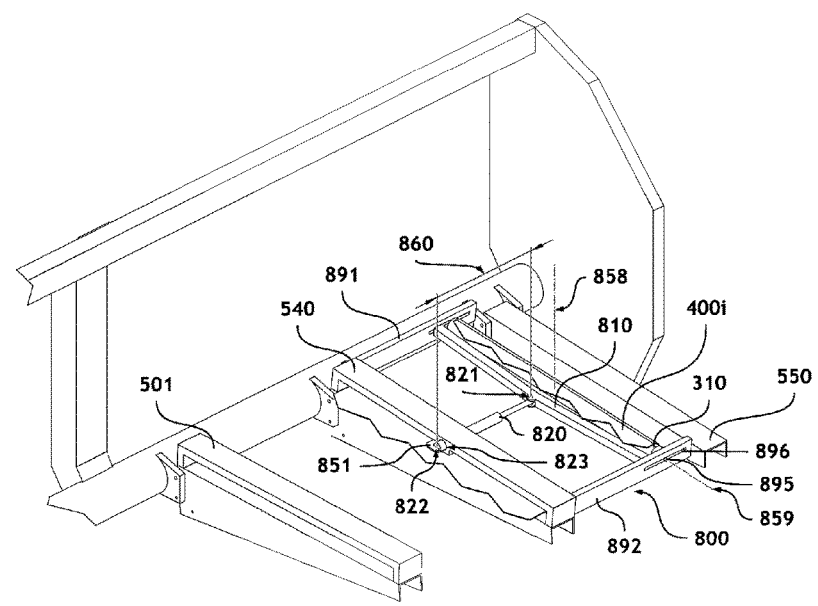
FIG. 6

US 10,257,981 B2

CONVEYOR BELT TENSING APPARATUS FOR A HARVESTING HEADER

CROSS-REFERENCE TO RELATED APPLICATIONS

This application is a continuation-in-part of patent application Ser. No. 14/735,196 filed Jun. 10, 2015, entitle CONVEYOR BELT TENSING APPARATUS FOR A HARVESTING HEADER, pending, the disclosure of which is incorporated herein by reference.

FIELD OF THE INVENTION

The present invention relates to harvesting platforms of the type that are carried on the front end of an agricultural threshing combine. More specifically, it relates to conveyor belt tensioners for the draper belts of the draper conveyor of an agricultural harvesting headers.

BACKGROUND OF THE INVENTION

An agricultural harvesting machine such as a combine tractor generally includes a harvesting front attachment mounted onto a feeder or crop elevator. The front attachment gathers the crop material from the field while the feeder directs it to a threshing separating and cleaning mechanism located in the combine to produce grains. The process further completes when those grains are sent from the combine to the next step of the production chain selected for this type grain.

For low growing, thin stemmed crops such as soybeans, barley, wheat, bean, etc., the header driven by the combine has a reciprocating knife at the leading edge called cutterbar. The crop is severed by the cutterbar and falls onto a laterally extending conveyor that carry the crop to a central section of the header. Nowadays, this laterally extending conveyor is preferably a draper conveyor, usually comprising multiple draper belts.

The header is mounted to the combine tractor at open end. The crop material travels laterally by means of the draper conveyor and passes then through this open end to the feeder of the combine.

The draper conveyor generally consist of two side belt conveyors, one on each side of the platforms open end. Each side belt conveyor normally comprises a closed loop belt wrapped around two rollers. Generally, one of this inner rollers is set to work as a driver and the other as an idler.

To grant the friction that allows the belts to be driven by the roller, each belt has to be tensioned to create the proper pressure against the corresponding idler and drive rollers. Most generally, belt tension is achieved by separating corresponding driver and idler roller from each other. Tension load to belts is such to permit the belt to carry the crop without driver roller slipages.

In modern design flexible draper platforms, the cutterbar assembly is forced to go up and down and curl to assimilate the contour of the ground to minimize crop picking losses; in most draper headers the draper conveyor behind the cutterbar is forced to flex therewith.

While in operation, the draper belts of the draper conveyor tend to curl and shape more aggressively at its leading edge close to the cutterbar than at its rear end close to the pivot point of the arms. As the belts are made of a non-resilient material, the draper belts tend to shape to a "V-form", forcing the supporting rollers to violently twist inwardly at their front margin.

Accommodating the flexing and twisting of the conveyor belts is difficult using traditional belt tensioners. The rollers must be able to push outward against the belt and also pivot side to side to distribute the tension across the belt. Tension on the belts may result inconstant and widely varying, thus resulting into belt breakages, slippages, or belts that may suffer premature wear.

Belt working tension for agricultural harvesting headers is usually within the range of 15 N/cm to 40 N/cm—tension per centimeter width of the belt. Most widely used belts are about 1000 mm width, thus requiring a tension equivalent to 407 kg. A male human operator shall output, on average, 345 N pulling force in a comfortable position. The rollers commonly used so support the draper conveyor of agricultural draper headers are about 60 mm diameter.

Under patent application publication number US20050045452 Hansrudolf discloses a mechanism to release draper belt from tension involving a crack-lever mechanism. Patent describes two belt tensioning devices arranged laterally offset of the roller mount, thus requiring the operator to execute two de-tensioning steps per belt each time service is required. Hansrudolf does not describe how to tolerate the roller twisting that occur in flexible draper headers; moreover, Hansrudolf presumes the displacement of the deflection roller should occur evenly. Moreover, considering the height of traditional draper header rollers, the crank lever as per Hansrudolf construction must be less than 63 mm, and also considering also the operators average output force and flexible drapers common belt width, the operating lever as per Hansrudolf will only permit a short motion of retraction of the roller thus not providing a comfortable looseness of the draper to quickly perform cleaning and service operations.

Under U.S. Pat. No. 8,495,855 Conrad and Dow disclose a method to tolerate belt uneven tension across its width. Method proposed is having both, idler and driver rollers featuring a twisting pivot axle in such manner that these rollers must pivot in the same direction about their roller pivot axes. Conrad and Dow do not specify how this mechanism tolerate the belt shringkage difference between belts rear and front margins when operating in a flexible draper header, that tend to twist rollers in opposite directions instead. Moreover, the method disclosed do not propose any mechanism to give constant tension to the belts that also can adapt to belt shape changes.

Beltman et al disclose under US20130284567 a construction to guarantee a correct belt tracking. Actuating elements to give proper tension to the belt as per Beltman disclosure require a bulky construction not applicable to traveling harvesting headers due to size requirements. Moreover, method is not applicable to flexible draper header where severe variating conical shape of the belt occur during operation because of different shrinkages from the rear to the front.

Tippery et al disclose under U.S. Pat. No. 7,448,491 a belt tensioning apparatus for a harvesting header. The first drawback of this mechanism is that it shall be applied to rigid draper conveyor structures, where no flexible cutterbar is needed and thus no severe belt shape change is required. Tippery et al disclose a mechanism with roller supported by a support bracket with said bracket being held by a pair of bracket extensions laterally offset of the roller; each bracket extension is slidingly engaged to a longitudinal support member, thus roller twist is accepted by different extensions of the bracket extensions. However, having the telescopic functionality of the bracket extensions with respect to the longitudinal support members do not permit the configuration to be used with pivoting transverse support members, because it would be necessary for the longitudinal support members to be flexible, and consequently the configuration cannot be used in flexible draper headers. Furthermore, Tippery et al disclose method to apply a uniform force to a roller, not a constant, which is not helpful when rollers twist to accommodate belt flexing. Moreover, Tippery et al mentions the actuator could be a hydraulic cylinder serviceable and configurable with an external hand pump. Hydraulic fluid is substantially non-compressible and do not permit easy actuator's extension and retraction during operation to accommodate belt shrinkages. Also, hydraulic cylinder power source is external and requires operators intervention to achieve belt tension.

It is an object of this invention to provide a compact belt tensioner to be installed in draper harvesting headers that accommodates the flexing and twisting of the conveyor belts and generates a constant tension evenly distributed across the width of the conveyor belts. Furthermore, the disclosed tensioner performs an automatic belt tension without the operators intervention.

SUMMARY OF THE INVENTION

According to a first fundamental aspect of the present invention, the header comprises a main frame extending laterally regarding the travel direction of the combine tractor. A plurality of arms articulated to the frame, spaced to each other, project substantially forward to a leading edge to hold the cutterbar assembly. A draper conveyor assembly is supported behind the cutterbar by a group of arms.

Cutterbar shall be operated to travel sliding over the ground. Ground curvature change and small objects on top of the ground push against the cutterbar and tempt it flex up and down lengthwise. The supporting arms therefore pivot up and down accordingly about the pivotal joints located in a rear portion close to the frame. Furthermore, as the draper conveyor assembly is backed up by the pivoting arms it is thus forced to twist and wring consequently.

Draper conveyor assembly comprise side draper conveyors to convey cut crop material inwardly to a central region of the header. The side draper conveyors consist of endless draper belts operable to travel mounted onto rollers. A first roller is located at a first lateral end of the draper belt and a second roller is placed at a second end of the draper belt to form an oval shaped loop.

Each roller is placed substantially parallel and adjacent to an arm, and is supported by roller supporting brackets. Supporting brackets are linked to the corresponding arm to pivot therewith.

Different angular position between adjacent arms are permitted; thus, a non periodic curved shape of the cutterbar assembly is allowed during operation. Adjacent supporting arms therefore shall dispose under different angular position to each other with respect to the main frame following cutterbar shape while in operation.

The pivotal joint of the arms is placed at its rear edge; the front edge of each arm travels a longer vertical distance than the rear edge—due to triangular similarity property. The draper belts wring according to the cutterbar assembly and the supporting arms. The rear margin of the draper belts wrings less aggressively than the front margin; the front edge of the draper belts shall curve in a greater manner that the rear edge during operation.

The draper conveyors are made of a non-resilient material. Curvature change difference between the rear portion and the front portion of the draper belt happen within a constant overall draper belt loop length. The rear portion of the draper belt shrinks laterally less than the front portion. Supporting bracket of the first roller allow said roller to twist about a normal axis with respect to the arm. First roller twist inwardly at their front edge and with respect to their rear edge to absorb draper belt shrinking difference between rear and front portions of the belt. First rollers shall displace at an angle with respect to the second roller while in operation.

For one roller of each draper belt, the linking mechanism between the supporting bracket and the corresponding arm includes an actuator. The actuator exerts a force to separate one the roller from the other. The separating force creates pressure to the rollers against the draper belt. In particular, actuator is a gas spring with a nearly constant force-displacement characteristic operating curve. Actuator extends and retracts with low load differences to permit different draper belt shrinkages during header operation. Actuator's power source is self contained, requiring no external connection or circuit of any kind.

A second fundamental aspect of the present invention derives from the header configuration according to the first fundamental aspect of the present invention. Supporting bracket of both the first and the second roller allow the corresponding roller to twist independently about a normal axis with respect to the corresponding arm. Both, the first and the second roller can twist inwardly at their front edge and with respect to their rear edge to absorb draper belt shrinking difference between rear and front portions of the belt.

On both rollers, the linking mechanism between the supporting bracket and the corresponding arm includes an actuator. The actuator exerts a force to separate one the roller from the other. The separating force creates pressure to the rollers against the draper belt. In particular, actuator is a gas spring with a nearly constant force-displacement characteristic operating curve. Actuator extends and retracts at with low load difference to permit different draper belt shrinkages during header operation. Specifically, actuators are a gas springs with a nearly constant force-displacement characteristic operating curve. Each actuator extends and retracts with low load differences to permit different draper belt shrinkages during header operation. Each actuator's power source is self contained, requiring no external connection or circuit of any kind.

A third fundamental aspect of the present invention is the method of operation of a mechanism to relive and give back the operating tension to the draper belts of the draper conveyors of a header configured as disclosed in second and third fundamental aspects of the present invention. The gas springs have self packed power source and are configured to exert a pushing force, and will extend automatically without the need of user intervention. To service draper belts, operator has to run a de-tentioning mechanism and apply a lock to hold tensioning mechanism retracted; after service is done, operator just need to release the lock and tension to the draper belt is achieved automatically.

BRIEF DESCRIPTION OF THE DRAWINGS

FIG. 5 is a top front perspective view of the draper belt isolated from the platform shown in FIG. 2, showing the front and the rear margin behavior when the draper conveyor flexes;

FIG. 6 is a top front perspective fragmentary view platform shown in FIG. 2, disclosing a first preferred embodiment for the belt tensioning mechanism;

Figure 1:
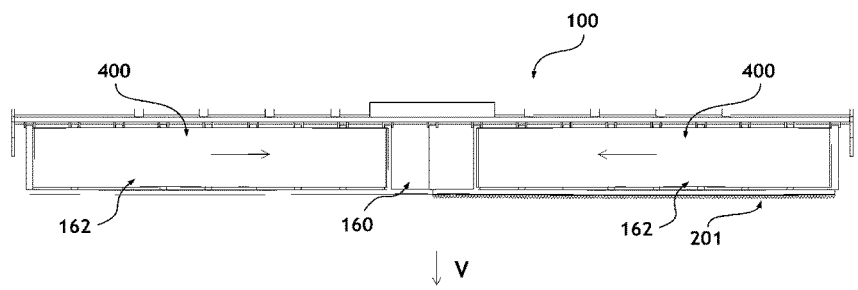
FIG. 1 is a top view illustrating a draper platform in accordance with the present invention.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE EMBODIMENT

The description stated below of the preferred models is merely an example of the medular concept idea and is not intended to limit the field of the invention, its application or uses.

Figure 2:
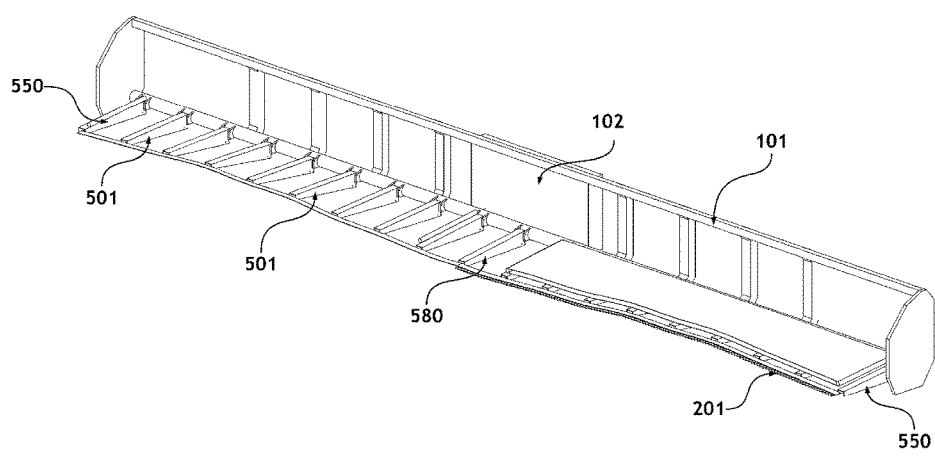
FIG. 2 is a top front perspective view a the platform according to the present invention showing the cutterbar support arms when belt conveyor is removed.

Referring to FIGS. 1 to 2, a top view of a platform 100 featuring a draper conveyor 400. Such draper conveyor 400 is set to transport cut crop material from lateral sections 162 of the platform towards a central section 160 of it. Platform is carried and powered by a combine tractor (now shown) and is towed by the combine tractor by an open end 102, placed in a rear portion of the central section. Side sections 162 project laterally from the central section 160. Platform is advanced in a direction V, generally perpendicular to the laterally extending side sections 162.

Standing crop is cut by a cutterbar assembly 201 placed in a leading edge, ahead of the draper conveyor 400. Such cutterbar assembly 201 can be leant on the ground to work sliding over the terrain and follow ground contour while is advanced. Such configuration determines the platform 100 features a flexible cutting system.

Figure 3:
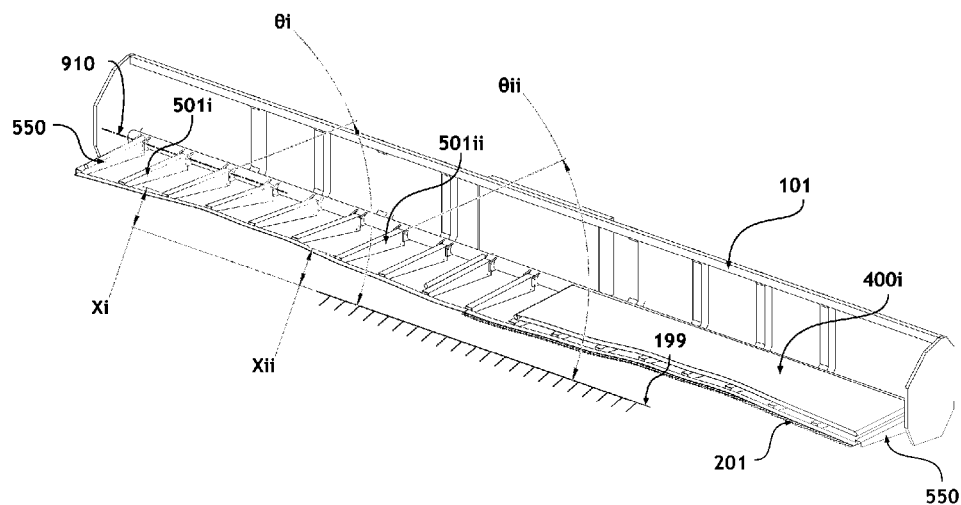
FIG. 3 is a top front perspective view of the platform shown in FIG. 2. The figure shows the cutterbar support arms with different pivoting angle and different height position with respect to the ground while the cutterbar assembly flexes.

Referring to FIGS. 1 to 3 it is shown the configuration of the draper conveyor 400 and cutterbar assembly 201 support structure. The platform 100 has a main frame 101 to support the hole structure. A plurality of support arms 501 are pivotally attached to the main frame. Each arm 501 projects generally forward, and is attached to the main frame by its rear end. The front end of each arm 501 is attached to the cutterbar assembly 201.

The draper conveyor 400 is supported by a set of arms 501. The preferred embodiment shows a draper conveyor with a pair of side draper belts 400i, one on each side section 162 of the platform. Each draper belt 400i is configured to follow the corresponding arms pivotal motion and thus to flex therewith. The arms pivotal motion is transferred from the ground pushing against the cutterbar assembly 201. As the ground shape greatly vary across the width of the platform 100 while in operation, cutterbar assembly is forced to curl and shape to mimic terrain curvature. Also, flexible cutterbar 201 permit avoiding and skipping small objects on top of the ground.

Referring to FIG. 3, two arms 501i, 501ii are pointed to show angular position and height differences between arms. As the arms are linked to the cutterbar 201, they must pivot with respect to the main frame 101 to follow cutterbar shape when flexing. The plane 199 is set parallel to the pivoting axle 910 of the arms 501 at a constant distance. Thus, arm 501i shall position at an angular position θi with respect to the plane 199 different to the arm 501ii angular position θii with respect to the plane 199, while in operation. Cutterbar 201 will curve such that its height Xi at the arm 501i measured from the constant plane 199 is different to the height Xii at the arm 501i measured from the constant plane 199.

Figure 4:
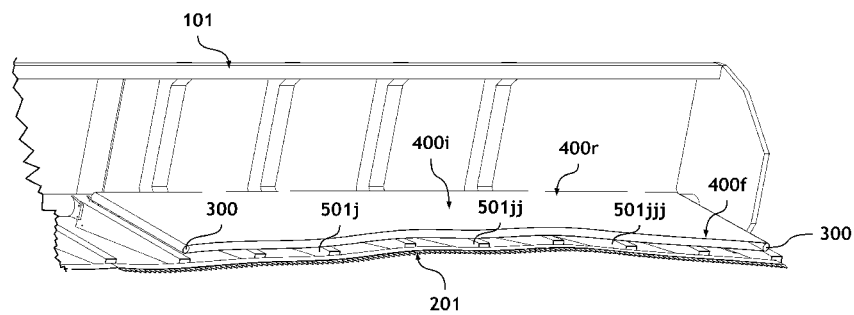
FIG. 4 is a top front perspective fragmentary view of the platform shown in FIG. 2 showing the draper conveyor flexing according to the flexed cutterbar assembly.

Draper belts are disposed to follow arms 501 shape and consequently to twist and wring proportionally. Referring to FIG. 4, each draper belt 400i is wrapped around a pair of rollers 300 to form an endless loop. Each roller is preferably linked to arm 501 such that it pivot accordingly. Each draper belt 400i projects forward from the main frame 101 to the cutterbar assembly 201. Each draper belt rear margin 400r is placed adjacent to the pivot axle 910 of the arms 501, while the front margin is located near the cutterbar assembly 201. It is obvious due to triangular similarity property that the front section of the pivoting arms 501 close to the cutterbar will travel a vertical distance greater that the vertical distance traveled by the rear section near the pivoting axle. As the draper belts 400i shape according to the arms 501, it is obvious then that draper belts 400i will always wring at the leading portion 400f in a greater manner than at its rear portion 400r.

Draper belts are preferably made of non-resilient materials, so they cannot be stretched or extended by normal tension or compression means. As it can be observed in FIG. 5, when the belt flexes more at the front margin 400f than at the rear margin 400r, the rear distance Rx between the supporting rollers at the rear margin is greater than the front distance Fx between the supporting rollers at the front margin. The consequence is that the draper conveyor adapts to a trapezoidal shape while in operation and that such shape is constantly varying according to ground conditions. It can be proven that the inter-roller angle β measured between the rotational axis of the supporting rollers 300 mostly depends on ground curvature.

Referring now to FIG. 6, a tensioning mechanism 800 for each draper belt 400i is shown. In a preferred configuration to avoid draper conveyor lateral displacement, a first supporting roller is rotably attached to an arm 501 and fixed such that it cannot move laterally with respect to said arm. Said fixed first roller is linked to one of the outermost arms of the set of arms that support the draper belt. The tensioning mechanism 800 is attached to the opposite outermost arm 540. A pair of support members 891, 892 project laterally outwards from the corresponding arm. Said support members are configured to pivot according to said arm 540.

A second roller 310 is held by a translating support bracket 810, with the translating support bracket slidingly supported by the support members 891, 892. Translating support bracket 810 features laterally offset projecting joints 895 that run through openings 896 at the support members. Elongated shape openings 896 permit the translating support bracket 810 to twist with respect to the corresponding arm. Such joint allows the second roller 310 to pivot against a normal axis 858, generally perpendicular to the draper belt 400i.

A linear actuator 820 is placed between the outermost arm 540 and the translating bracket 810, such that the linear actuator pushes the bracket 810—and thus the second roller 310—outwardly from the outermost arm 540. As the first roller is fixed, linear actuator's 820 force tend to separate first roller from second roller and thus tensioning the draper belt wrapper around. Furthermore, the linear actuator 820 is specifically a gas spring with a nearly constant force-displacement characteristic curve. Moreover, linear actuator is constructed compact enough to fit in the space withing the upper run and the lower run of the draper belt 400i and within the front margin 400f and the rear margin 400r of said belt 400i.

While in operation, belt front distance Fx shrinkage greater than belt rear distance Rx shrinkage forces the second roller 310 to twist inwardly while keeping belt tracking to both rollers. Belt shrinkage affects the linear actuator extension length 860, resulting into constantly changing (shrinking and stretching out) extension length during operation. Linear actuator 820 function obtained from a gas spring is beneficial because it can retract a great distance without big changes in the pushing force. Compared to hydraulically operated cylinders, gas springs self-pack its force power source, while cylinders need a hydraulic circuit with a separate power source. Another benefit of the gas springs compared to steel coil springs is their independence to weather changes and aging. Draper header belt tensioning devices using coil springs need periodic tension adjustments to set the proper tension.

Linear actuators are mounted into hollow cavities 823 in the corresponding arms 540, limited at the rear end 822 by a stop plate 851. Thus the linear actuator pivots with the arm 540 altogether. In a preferred embodiment no locking or securing is set to the gas springs, it is mounted loose free, thus gas springs are free to be removed by pulling them away from stop plate 851 when the draper belt 400i is not present.

Figure 7:
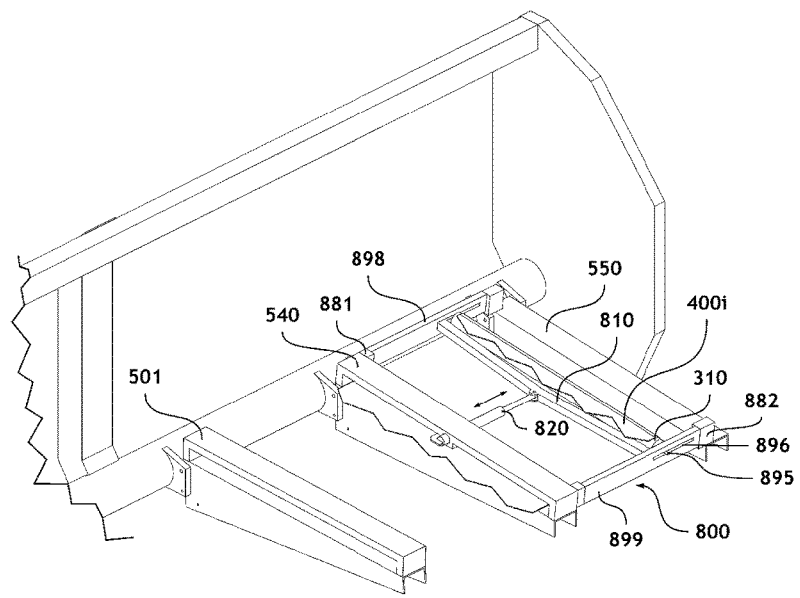
FIG. 7 is a top front perspective fragmentary view platform shown in FIG. 2, disclosing a second preferred embodiment for the belt tensioning mechanism.

Considering the embodiment of FIG. 7, each pair of support members 898, 899 is linked to the corresponding outermost arm 540 at one side and to an end arm 550 at the other side. The end arm 550 is located laterally outside the respective draper belt 400i. The support members 898, 899 linked to the outermost arm by means of joints 881, and are linked to the end arm by means of joints 882. The joints 881, 882 are made either of a resilient material or are rotary joints. The joints 881, 882 permit the end arm 550 to pivot to an angle mismatching the pivoting angle of the outermost arm 540; in this embodiment the hollow cavity has an oversized hole diameter to permit linear actuator 820 angle change to match support members 898, 899 angle.

In a preferred configuration not illustrated, each translating roller bracket is pushed by two gas springs, a first linear actuator and a second linear actuator, each one mounted into the arm 540 by its rear end. The first linear actuator is connected at a leading edge of the translating roller bracket while the second linear actuator is connected to a rearward end of the translating roller bracket. Each linear actuator moves forward and rearward in a direction parallel to the travel direction of the draper conveyors 400 and perpendicular to the direction of travel "V" of the draper header 100. Both linear actuator are disposed such that they are parallel with each other and intersect the rotational axis of the second roller 320, thus the second roller 320 displaces always over a plane surface. In this configuration, the first linear actuator specifically absorbs the front distance Fx belt shrinkage at the leading margin 400f.

Figure 8:
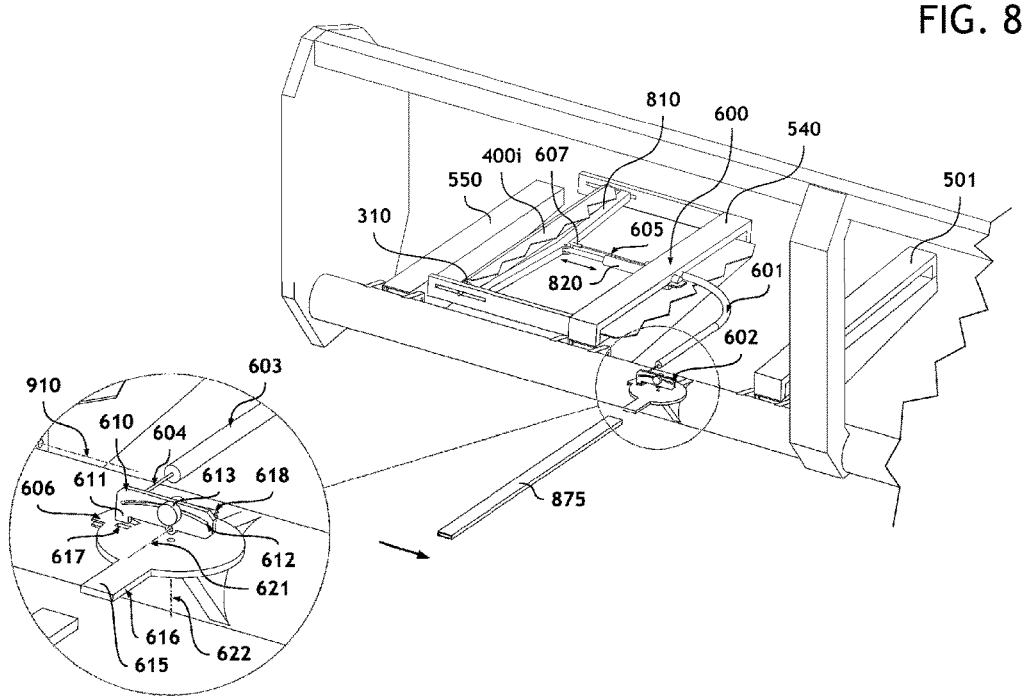
FIG. 8 is a top rear perspective fragmentary view platform shown in FIG. 2 with a detail view, disclosing a preferred embodiment for a tension removal mechanism for the belt tensioning mechanism.

Referring to FIG. 8, it is shown a preferred embodiment for the mechanism to release tension to the draper belts 400i. Tension removal mechanism 600 comprises a push-pull command cable 601, a pushing pulley 602, a detachable lever 875 and a ratchet locking member 610. Command cable 601 comprises a head section 605 and a tail section 604, wherein the head section is made of a flexible cord and is attached at the head end 607 to the translating roller bracket 810, and wherein the tail section is also made of a flexible cord and is attached at the tail end 606 to the pushing pulley 602. Flexible head section permits relative displacements and angular displacements of the second roller with respect to the outermost arm 540. Flexible tail section allows the cord to accommodate to the push pulley groove 618 when operating the tension removal mechanism. Also, flexible tail section permit the outermost arm 540 pivotation with respect to the pushing pulley 602.

In an illustrative embodiment, ratchet locking member 610 comprises a seesaw member and a counterweight 613. Seesaw member comprises a pin section 611, a groove 618 and a rotary joint. Counterweight 613 can be placed into a first and a second position, such that it forces the seesaw member to tilt to a first side or to a second side. Tilting happen around tilting axis 621 of the pivotal joint. When operators places counterweight to the first unlocking position, the seesaw member rotates such that the pin section 611 moves away from the pushing pulley 602. The pushing pulley is generally a disc member 616 comprising a grooved section 618 to hold a cable, a set of radially spaced holes 617 aligned to the pin section of the pushing pulley and a lever attaching arm 615. Pushing pulley is fixed to the main frame 101 to rotate against a twisting axis 622. When operators places counterweight to the second locking position, the seesaw member rotates such that the pin section 611 comes closer the pushing pulley 602. The down force of the counterweight 613 pushes the pin section 611 of the seesaw member against the pushing pulley. If the operators inserts the detachable lever 875 into the attaching arm 615 and powers the pushing pulley 602 while the counterweight is set at the second locking position, the pin section 611 will get inserted into one of the holes 617, locking the pushing pulley rotational motion and thus holding the translating roller bracket 810 in a retracted position.

Tension can be then gained back by placing the counterweight to the first unlocking position and slightly powering the pushing pulley so that the pin section 611 get released. As the linear actuator 820 is a self-packed power gas spring, tension to the belt is achieved automatically without needing further adjustments.

Figure 9:
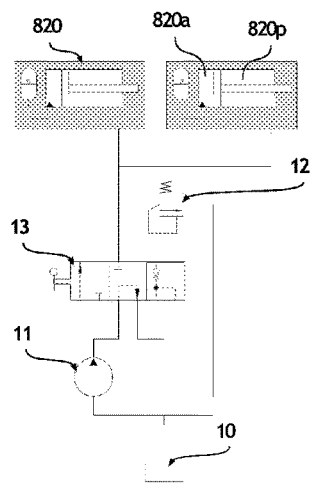
FIG. 9 is a first hydraulic circuit schematic for a preferred embodiment of a tension removal mechanism for the belt tensioning mechanism.

Now referring to FIG. 9, a first embodiment for a hydraulic tension removal mechanism is shown. Mechanism make use of a pressure source 11 such as a hydraulic pump, and hydraulic fluid reservoir 10 such as a tank and multi-positional valve 13 such like a rotary spool manual valve. Hydraulic tension removal mechanism may include a protecting element such like a pressure relief valve. In this preferred configuration, each linear actuator 820 has an active chamber 820a and a passive chamber 820p. Active chamber 820a is filled with the inert gas that powers actuator such that the rod pushes in a first direction, while the passive chamber 820p is intentionally filled with hydraulic pressurized fluid to retract the rod through a second direction. When operator sets the multi-positional valve 13 to a first combination, pressure source 11 forces fluid to passive chamber of the linear actuators, releasing draper belt 400i tension. If necessary, a pressure relief valve 12 can placed to short-circuit pressure from the pump to the reservoir 10, limiting the maximum pressure that operates the passive chambers 820p. When operators sets the multi-positional valve 13 to a second combination, the pump 11 and the passive chambers 820p get short circuited to reservoir 10; active chamber 820a pushing force will help the fluid inside the passive chamber 820p to flow out to reservoir until draper belt loop stop rod's motion and held the actuator pushing force—belt gains then the working tension. When operators sets the multi-positional valve 13 to a third combination the pump 11 get short circuited to reservoir 10 and the port to the passive chambers 820p get blocked; this is the working combination. In this last combination, linear actuator rod movements cause undesired pressure in the passive chambers 820p that can be released by the safety valve 12.

Figure 10:
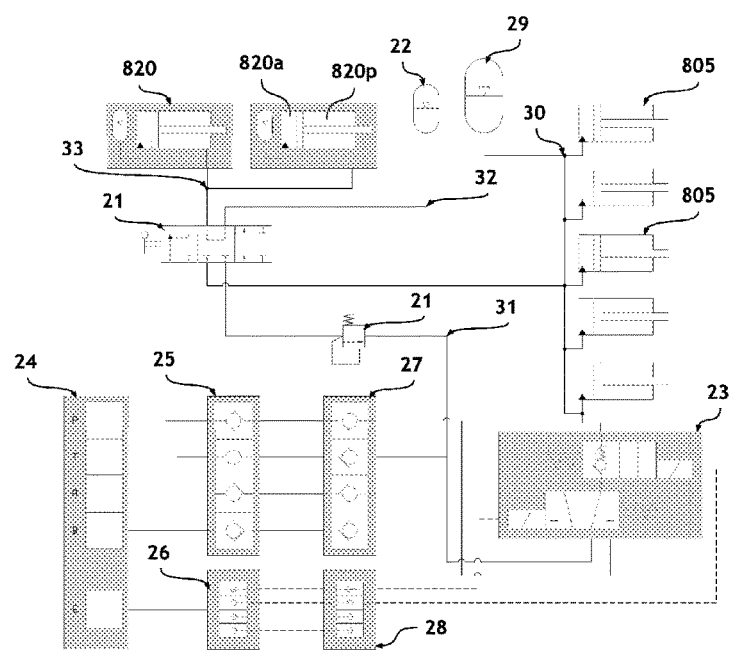
FIG. 10 is a second hydraulic circuit schematic for a preferred embodiment of a tension removal mechanism for the belt tensioning mechanism.

Referring to FIG. 10, a second embodiment for a hydraulic tension removal mechanism is shown. Mechanism can be applied to flexible draper platforms featuring a first hydro-pneumatic accumulator 29. In this embodiment, first hydro-pneumatic accumulator is used as a power source for the actuator members 805 that withstand the cantilever loads, at least partially, to the flexible cutterbar assembly support arms. First hydro-pneumatic accumulator communicate to actuator members via line 30. An electrically driven hydraulic valve 23 is connected to line 30 to increase or decrease line fluid pressure.

Platform 100 is commanded by the combine tractor (not show) that is attached to. Combine tractor features an electric-hydraulic power and signal source 24. Combine tractor has a hydraulic coupler 25 that attaches to the platform's hydraulic coupler 27, and has an electric coupler 26 that attaches to the platform's electric coupler 28. Then, the combine tractor configures as an electric-hydraulic power and signal source for the platform 100.

Electric-hydraulic valve 23 is placed at the platform 100 and is powered and commanded by the combine tractor. Operator can manipulate the electric-hydraulic valve 23 from within the cab to increase or decrease pressure in line 30 as desired.

The illustrated mechanism make use of a multi-positional valve 13 such like a rotary spool manual valve. Mechanism further incorporates a second hydro-pneumatic accumulator 22 connected to line 32. Linear actuator passive chambers 820p are connected to a common line 33. Line 31 is a return line and communicate both the multi-positional valve 13 and the electric-hydraulic valve 23 to a return line at the platforms hydraulic coupler 27. The link between the multi-positional valve 13 and the return line 31 is made through a pressure resistance valve 21. Pressure resistance valve 21 will only allow fluid to travel to line 31 if it is above a preset pressure.

When operator sets the multi-positional valve 21 to a first combination, line 33 gets short circuited to line 31, and each active chamber 820a pushing force will help the fluid inside the passive chamber to flow out to return line 31 until draper belt loop stop rod's motion and held the actuator pushing force—belt gains then the working tension; second hydro-pneumatic accumulator 22 also get fluid discharge until pressure in line 32 reaches the preset value of valve 21.

After applying the first combination, operators has to set the multi-positional valve 21 to a second combination; this is the working combination. In this combination, line 33 gets short-circuited to line 32 while the other ports get blocked. As the second hydro-pneumatic accumulator 22 cannot fully discharge because of valve 21, the remaining pressure helps to cancel the undesired pressure in the passive chambers 820p resulting from the linear actuator rod movements.

When operators sets the multi-positional valve 21 to a third combination, pressure line 30 gets short-circuited to line 33. As the fluid pressure in line 30 is usually set relatively high, first hydro-pneumatic accumulator 29 will discharge fluid filling the passive chambers 820p of the linear actuators to release draper belts 400i tension; all other ports get blocked.

Figure 11:
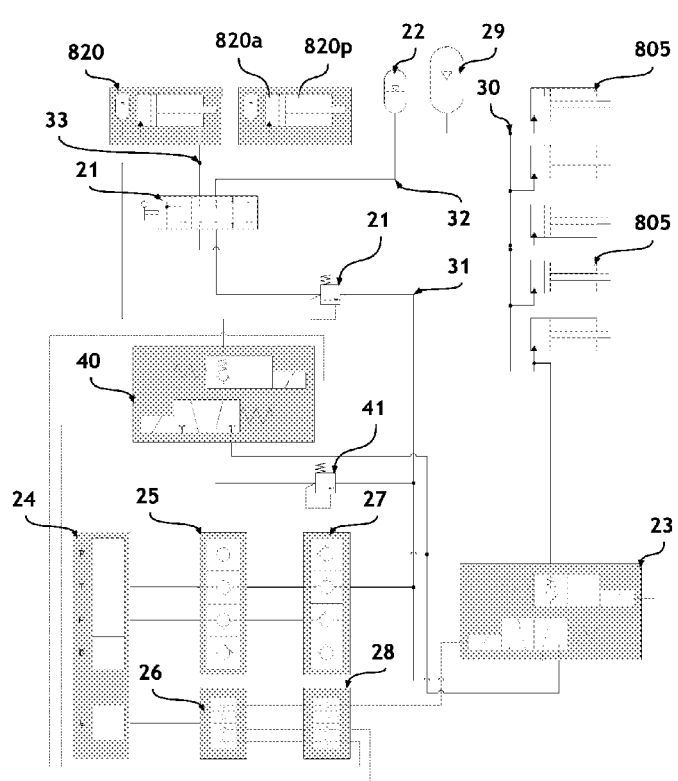
FIG. 11 is a third hydraulic circuit schematic for a preferred embodiment of a tension removal mechanism for the belt tensioning mechanism.

It is obvious that either of the aforementioned hydraulic tension removal mechanisms shall include a separate hydraulic cylinder to retract the linear actuators 820 instead of filling their passive chamber with pressurized fluid. It is also obvious that a specific header configuration may remove manual valve 21 from the schematic shown in FIG. 11 to make a more user-friendly application with only electrically-driven manipulation. Furthermore, several configuration of manual or electric-hydraulic valves or other valves shall be implemented. It is in the scope of the present invention to protect such alterations to the described embodiment.

The preferred forms of the invention described above are to be used as illustration only, and should not be utilized in a limiting sense when interpreting the scope of the present invention. Some alterations to the exemplary embodiments described above could be readily made by those skilled in the art without departing from the spirit of the present invention.

The inventor hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. An agricultural platform used to harvest crops, said platform operable to be supported at an open end that is configured to receive severed crop materials, said platform comprising:
    a main frame (101) operable to be mounted to the open end (102), said main frame comprising a central section (160) located adjacent to said open end, and comprising right and left lateral sections (162) at the sides of said central section extending transversely with respect to a normal direction of travel (V) of the platform;
    a plurality of arms (501) pivotally coupled to the frame (101) to pivot up and down at their forward ends with regard to said frame (101) and extending forward from said frame (101); said arms configured to pivot about an arm pivot axis (910) at their rear end;
    a cutterbar assembly (201) extending lengthwise through said lateral and central sections; said cutterbar assembly being operable to flex along the length thereof in response to changes in terrain as the platform is advanced;
    said cutterbar assembly being attached to and being partially supported by a set of arms of said plurality of arms (501) at their forward ends;
    a draper conveyor assembly (400) comprising lateral belt conveyors (400i) disposed behind the cutterbar assembly to flex therewith; said draper conveyor assembly being supported on the lateral sections (162) to convey cut crop material laterally inwardly toward the central section (160);

each lateral belt conveyor being partially supported by a set of arms of said plurality of arms (501); wherein each lateral belt conveyor comprises a front margin (400f) and a rear margin (400r);

each lateral belt conveyor configured to flex to a first shape and to a second shape; wherein said first shape being formed at said front margin and wherein said second shape being formed at said rear margin; and at least one belt tensioning mechanism (800) in each lateral belt conveyor, each belt tensioning mechanism comprising:

One arm of the plurality of arms (501) being configured as a belt tension mechanism first support arm (540);

a first support member (891) and a second support member (892) projecting laterally outwards from the first support arm (540), wherein said first support member (891) and said second support member (892) are configured to jointly pivot with said first support arm;

a roller (310) comprising a front end and a rear end and a central axis, wherein the lateral belt conveyor belt is wrapped around the roller (310) for approximately 180 degrees to form an end loop in said lateral belt conveyor;

an elongate translating support bracket (810) being configured to support the roller (310) for rotation about the central axis; wherein the translating support bracket being slidingly supported by the first support member to form a first sliding joint and wherein the translating support bracket being slidingly supported by the second support member to form a second sliding joint, said first sliding joint and said second sliding joint configured to permit the roller (310) to pivot against a normal axis (858) generally perpendicular to the lateral belt conveyor;

a first linear actuator (820) comprising a front end and a rear end, wherein the rear end is directly engaged to the first support arm (540), wherein the front end is directly coupled to the translating support bracket (810) to exert a force applied to said support bracket (810), and wherein the first linear actuator (820) is a gas spring with a substantially constant force-displacement characteristic curve; and wherein said the first linear actuator (820) self-packs its force power source and does not require external adjustments.

2. The agricultural platform according to claim 1, wherein the first shape of flexing of each lateral belt conveyor (400i) projects to the second shape of flexing of each lateral belt conveyor to form an intermediate third shape;

said first shape of flexing, said second shape of flexing and said third shape of flexing conform altogether a smooth surface;

the curvature of the first shape of flexing is always greater or equal to the curvature of the second shape of flexing.

3. The agricultural platform according to claim 2, wherein the front margin (400f) of each lateral belt conveyor (400i) presenting a first lateral linear length (Fx) and wherein the rear margin (400r) of each lateral belt conveyor (400i) presenting a second lateral linear length (Rx);

the length of the first lateral linear length is always shorter or equal to the second lateral linear length.

4. The agricultural platform according to claim 1, wherein:
said first support arm (540) presenting a transversely hollow cavity (823);
said first linear actuator (820) being inserted into the hollow cavity (823).

5. The agricultural platform according to claim 4, wherein:
said first linear actuator (820) presenting an overall diameter;
said hollow cavity (823) being oversize with respect to the overall diameter of the first linear actuator to permit linear actuator misalignment.

6. The agricultural platform according to claim 1, wherein:
at least one arm of said plurality of arms (501) being configured as second support arm (550); said second support arm being disposed laterally outside the lateral belt conveyor (400i);
said first support member and said second support member being attached to the first support arm (540) by means of a first joint (881);
said first support member and said second support member being attached to the second support arm (550) by means of a second joint (882);
said first joints and said second joints being configured to permit the second support arm to pivot to an angle mismatching the pivoting angle of first support arm (540).

7. The agricultural platform according to claim 6, wherein said first joints and said second joints being made of a resilient material or are rotary joints.

8. The agricultural platform according to claim 3, wherein:
each translating support bracket (810) laterally presenting a front section and a rear section;
the front end of said first linear actuator being connected to the front section of said translating support bracket;
each belt tensioning mechanism (800) comprising a second linear actuator;
said second linear actuator comprising a front end and a rear end, wherein the rear end is engaged to the first support arm (540), wherein the front end is coupled to the rear section of the translating support bracket (810) to exert a force applied to said support bracket (810),
wherein the second linear actuator is a gas spring with a substantially constant force-displacement characteristic curve, and wherein said the second linear actuator self-packs its force power source and does not require external adjustments.

9. The agricultural platform according to claim 8, wherein:
said first linear actuator comprising an overall extension length; said overall length being mainly dependent to the first lateral linear length (Fx);
said second linear actuator comprising an overall extension length;
the overall extension length of the first linear actuator is always shorter or equal to the overall extension length of the second linear actuator.

10. The agricultural platform according to claim 1, wherein:
each belt tensioning mechanism (800) comprising a retracting apparatus (600) operable to pull the translating support bracket (810) inwardly to release the tension to the lateral draper conveyor;

said retracting apparatus (600) further comprising:
   a traction element (602);
   a linking element (601) configured to mechanically link the translating support bracket (810) to said traction element (602); and
   a locking member (610) operable to hold the traction element still and the translating support bracket in a retracted position.

11. The agricultural platform according to claim 10, wherein:
   said platform (100) further comprising a detachable lever element (875);
   said lever element being configured as an intermediate member between a platform's operator and the traction element (602);
   said lever element being operable to enhance the force developed by said platform's operator and applied to the traction element.

12. The agricultural platform header according to claim 10, wherein:
   said locking member (610) being configured to block the translating support bracket (810) in predefined steps such that the linear actuator extension length can be retracted step by step in different retracted positions.

13. The agricultural platform according to claim 1, wherein:
   each belt tensioning mechanism (800) comprising a hydraulically powered retracting apparatus operable to pull the translating support bracket (810) inwardly to release the tension to the lateral draper conveyor;
   said hydraulically powered retracting apparatus further comprising:
      a fluid power source;
      a multi-positional valve operable to a first position for releasing the tension of the tensioning mechanism to the lateral belt conveyor and operable to a second position for insulating the fluid power source from the tensioning mechanism to permit the corresponding linear actuator to achieve lateral belt conveyor working tension; and
      said multi-positional valve receives power for releasing tension of the tensioning mechanism from the fluid power source.

14. The agricultural platform according to claim 13, wherein:
   each linear actuator (820) comprising an active chamber (810a) and a passive chamber (810b);
   said active chamber being filled by a first fluid to exert an extending force;
   said passive chamber intentionally receiving a second pressurized fluid from the power source when said multi-positional valve is operated to said first position;
   said second fluid configured to exert a greater force than the force exerted by the first fluid in the active chamber; wherein said second fluid forces the linear actuator to retract;
   said first fluid operable to force the second fluid to flow out from the passive chamber when said multi-positional valve is operated to said second position.

15. The agricultural platform according to claim 14, wherein:
   said platform further comprising:
      a first hydro-pneumatic accumulator (29);
      a plurality of hydraulic actuators (805); said hydraulic actuators configured to partially withstand the cantilever loads to the plurality of arms (501);
      each of said plurality of hydraulic actuators (805) being hydraulically linked to said first hydro-pneumatic accumulator (29) by a first hydraulic line (30);
      the pressure of said first hydraulic line operable to be altered by the power source, wherein said power source is an external source such as the combine tractor that the platform is attached to.

16. The agricultural platform according to claim 15, wherein:
   said platform further comprising:
      a second hydro-pneumatic accumulator (22);
      said second hydro-pneumatic accumulator being attached to a second hydraulic line (32);
      a third hydraulic line (33) operable to hydraulically link the passive chambers of the linear actuators;
      said multi-positional valve being operable to a third working position for communicating said second hydraulic line to said third hydraulic line;
      said hydraulic link allowing the second fluid to flow in and out between the passive chamber and the second hydraulic accumulator when said multi-positional valve is operated to said third position.

17. The agricultural platform according to claim 16, wherein:
   said platform further comprising:
      an electric-hydraulic valve (40) operable to modify the third hydraulic line (33) pressure;
      said electric-hydraulic valve being remotely operable from said power source.

* * * * *